(12) United States Patent
Yoo et al.

(10) Patent No.: US 9,057,807 B2
(45) Date of Patent: Jun. 16, 2015

(54) DISPLAY APPARATUS

(75) Inventors: Jun-mo Yoo, Yongin-si (KR); Sang-hwi Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 13/527,070

(22) Filed: Jun. 19, 2012

(65) Prior Publication Data

US 2013/0070156 A1    Mar. 21, 2013

(30) Foreign Application Priority Data

Sep. 20, 2011 (KR) .......................... 10-2011-0094397

(51) Int. Cl.
*F21V 7/04* (2006.01)
*F21V 8/00* (2006.01)

(52) U.S. Cl.
CPC ............... *G02B 6/003* (2013.01); *G02B 6/009* (2013.01); *G02B 6/0046* (2013.01); *G02B 6/0096* (2013.01)

(58) Field of Classification Search
CPC .... G02B 6/0021; G02B 6/009; G02B 6/0091; G02B 6/0073
See application file for complete search history.

(56) References Cited

U.S. PATENT DOCUMENTS

| | | | | |
|---|---|---|---|---|
| 6,361,186 | B1 * | 3/2002 | Slayden | 362/241 |
| 8,773,618 | B2 * | 7/2014 | Seo et al. | 349/65 |
| 2008/0231772 | A1 | 9/2008 | Hung | |
| 2011/0095970 | A1 | 4/2011 | Yoo | |
| 2011/0170034 | A1 * | 7/2011 | Jeong | 349/61 |

FOREIGN PATENT DOCUMENTS

KR    10-2011-0045515 A    5/2011

OTHER PUBLICATIONS

Communication, dated Oct. 31, 2012, issued by the Korean Intellectual Property Office in counterpart Korean Patent Application No. 10-2011-0094397.
Communication, dated Jan. 16, 2013, issued by the European Patent Office in counterpart European Patent Application No. 12173862.9.

* cited by examiner

*Primary Examiner* — Andrew Coughlin
(74) *Attorney, Agent, or Firm* — Sughrue Mion, PLLC

(57) ABSTRACT

A display apparatus including: a cover; a display panel which is accommodated in the cover; a plurality of light emitting elements arranged in at least one edge of the cover from a rear surface of the display panel; a lens which extends in parallel with an arrangement direction of the light emitting elements and is arranged in a light emitting direction; a reflection sheet installed in a rear surface of the display panel; and a holder which includes a holder main body that extends along the at least one edge, a light emitting element accommodator formed in a surface of the holder main body to accommodate therein the light emitting elements and a lens supporter that is spaced from the light emitting element accommodator and is formed in the surface of the holder main body to couple and support the lens.

18 Claims, 11 Drawing Sheets

US 9,057,807 B2

DISPLAY APPARATUS

CROSS-REFERENCE TO RELATED APPLICATION

This application claims priority from Korean Patent Application No. 10-2011-0094397, filed on Sep. 20, 2011 in the Korean Intellectual Property Office, the disclosure of which is incorporated herein by reference.

BACKGROUND

1. Field

Apparatuses and methods consistent with the exemplary embodiments relate to a display apparatus which includes a display panel to display an image thereon and a backlight unit to supply light to the display panel, and more particularly, to a display apparatus which has an improved assembly structure for a backlight unit.

2. Description of the Related Art

Unlike an image processing apparatus such as a set-top box, a display apparatus such as a TV or a monitor includes a display panel to display an image with a broadcasting signal or image data in various formats. The display panel varies including a liquid crystal display (LCD) panel or a plasma display panel (PDP) and applies to various display apparatuses. If the display panel cannot generate light by itself such as the LCD panel, the display apparatus includes a backlight unit (BLU) to generate and supply light to the display panel.

The BLU of the display apparatus makes light, which is emitted by a light source such as a cold cathode fluorescent lamp (CCFL) or a light emitting diode (LED), uniform through a light guide plate and supplies the uniform light to the display panel.

However, due to the weight of the light guide plate, the conventional display apparatus may be heavy. Further, as an optical pattern is processed in a rear surface of the light guide plate to make the light uniform, the design of the light guide plate is complicated. That is, the light guide plate of the conventional display apparatus accounts for a large share of weight and manufacturing costs compared to other elements of the display apparatus.

SUMMARY

The foregoing and/or other aspects may be achieved by providing a display apparatus including: a cover; a display panel which is accommodated in the cover; a plurality of light emitting elements which are arranged in at least one of the edges in four directions of the cover from a rear surface of the display panel; a lens which extends in parallel with an arrangement direction of the light emitting elements and is arranged in a light emitting direction of the light emitting elements to receive light from the light emitting elements; a reflection sheet which is installed in a rear surface of the display panel and reflects light from the lens to the display panel; and a holder which includes a holder main body that extends along the at least one edge, a light emitting element accommodator that is formed in a surface of the holder main body to accommodate therein the light emitting elements and a lens supporter that is spaced from the light emitting element accommodator and is formed in the surface of the holder main body to couple and support the lens.

The lens may include a lens main body, a first extension part which extends from the lens main body in a first direction facing the display panel, and a second extension part which extends in a second direction that is opposite to the first direction, and the lens supporter may include a first supporter which supports the first extension part and a second supporter which supports the second extension part.

The second supporter may include a second supporter main body which extends in a third direction in parallel with the light emitting direction, and a second supporter hook which is shaped like a hook and protrudes from the second supporter main body in the first direction, and the second supporter main body may elastically move from the holder main body by a pressure of the second extension part due to an external force when the lens is mounted in the lens supporter in a fourth direction that is opposite to the third direction by the external force.

The second supporter hook may be round at a contact area contacting the second extension part when the lens is mounted.

The first supporter may include a first supporter main body which extends in the third direction and a first supporter step which extends from an end part of the first supporter main body in the second direction and prevents the first extension part accommodated in the first supporter from being separated therefrom, and the first supporter may not elastically move from the holder main body by the external force applying to the fourth direction.

The first supporter may include a first supporter main body which extends in the third direction and a first supporter hook which is shaped like a hook and protrudes from the first supporter main body to the second direction, and the first supporter main body may elastically move from the holder main body by pressure of the first extension part by an external force when the lens is mounted in the lens supporter in the fourth direction by the external force.

The first supporter hook may be round at a contact area contacting the first extension part when the lens is mounted.

The first supporter may include a first supporter main body which extends in a third direction in parallel with the light emitting direction and a first supporter hook which is shaped like a hook and protrudes from the first supporter main body to the second direction, and the first supporter main body may elastically move from the holder main body by pressure of the first extension part due to an external force when the lens is mounted in the lens supporter in a fourth direction that is opposite to the third direction by the external force.

The second supporter may include a second supporter main body which extends in the third direction and a second supporter step which extends from an end part of the second supporter main body to the first direction and prevents the second extension part accommodated in the second supporter from being separated therefrom, and the second supporter may not elastically move from the holder main body by the external force that applies to the fourth direction.

The first and second supporters may form an accommodation space that extends to accommodate the first and second extension parts in a lengthwise direction of the holder main body and includes an area that communicates with the outside through at least one of opposite end parts of the holder main body in the lengthwise direction, and the first and second extension parts may slide along the lengthwise direction through the communication area and are mounted in the first and second supporters.

The lens may include a lens that is formed by extrusion molding and a shape of a section of the lens that is vertical to a lengthwise direction is the same along the lengthwise direction.

The display apparatus may further include a printed circuit board which is mounted to operate the plurality of light emitting elements, and the printed circuit board may be coupled to the light emitting element accommodator by screw.

The light emitting element accommodator may have a circuit printed in a plate surface to operate the plurality of light emitting elements, and the plurality of light emitting elements may be mounted in the plate surface of the light emitting element accommodator where the circuit is printed.

The display apparatus may further include an image receiver which receives an image signal, and an image processor which processes an image signal that is transmitted to the image receiver, to be displayed on the display panel as an image.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
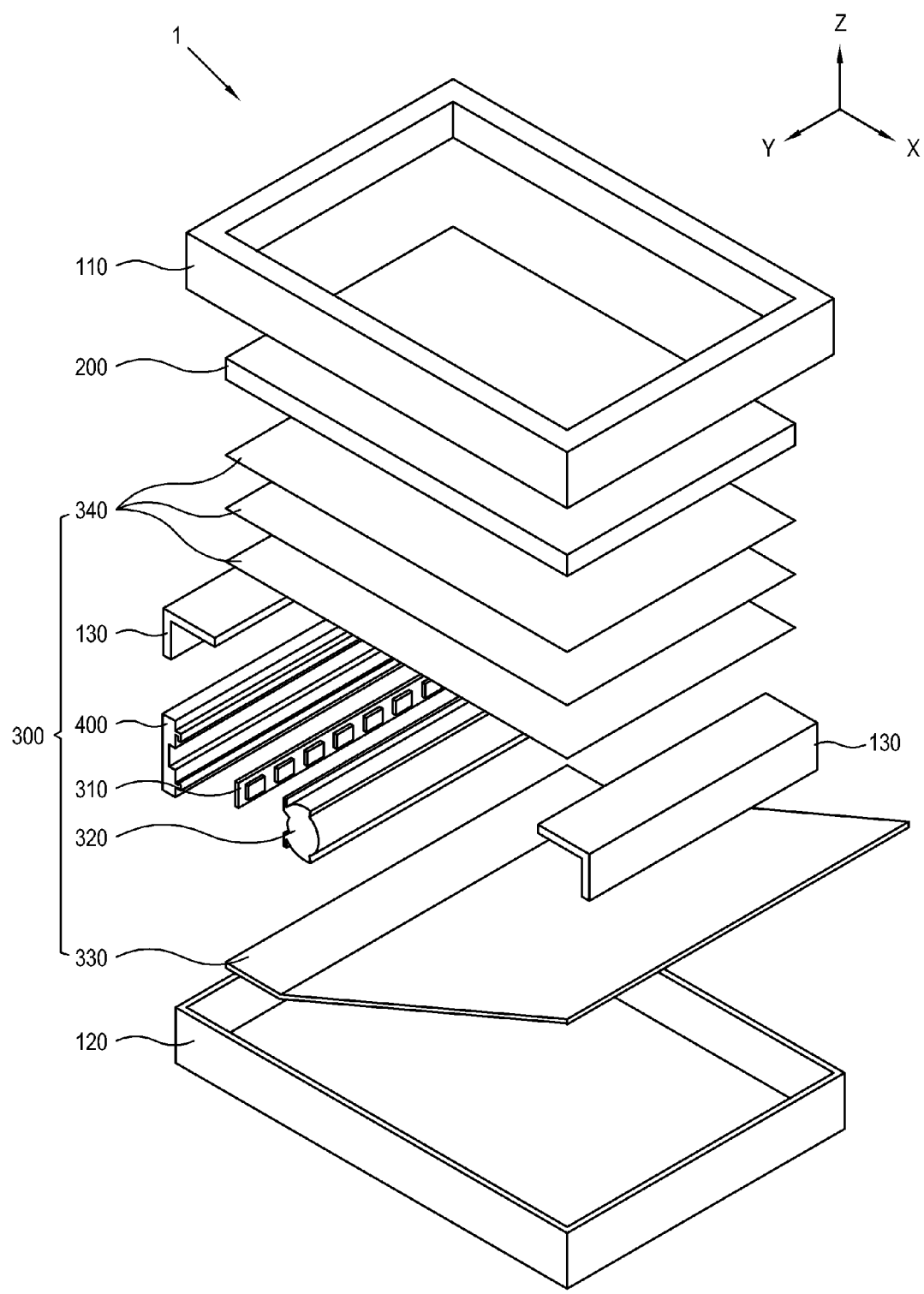
FIG. 1 is an exploded perspective view of a display apparatus according to a first exemplary embodiment of the present invention.

Below, exemplary embodiments will be described in detail with reference to the accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
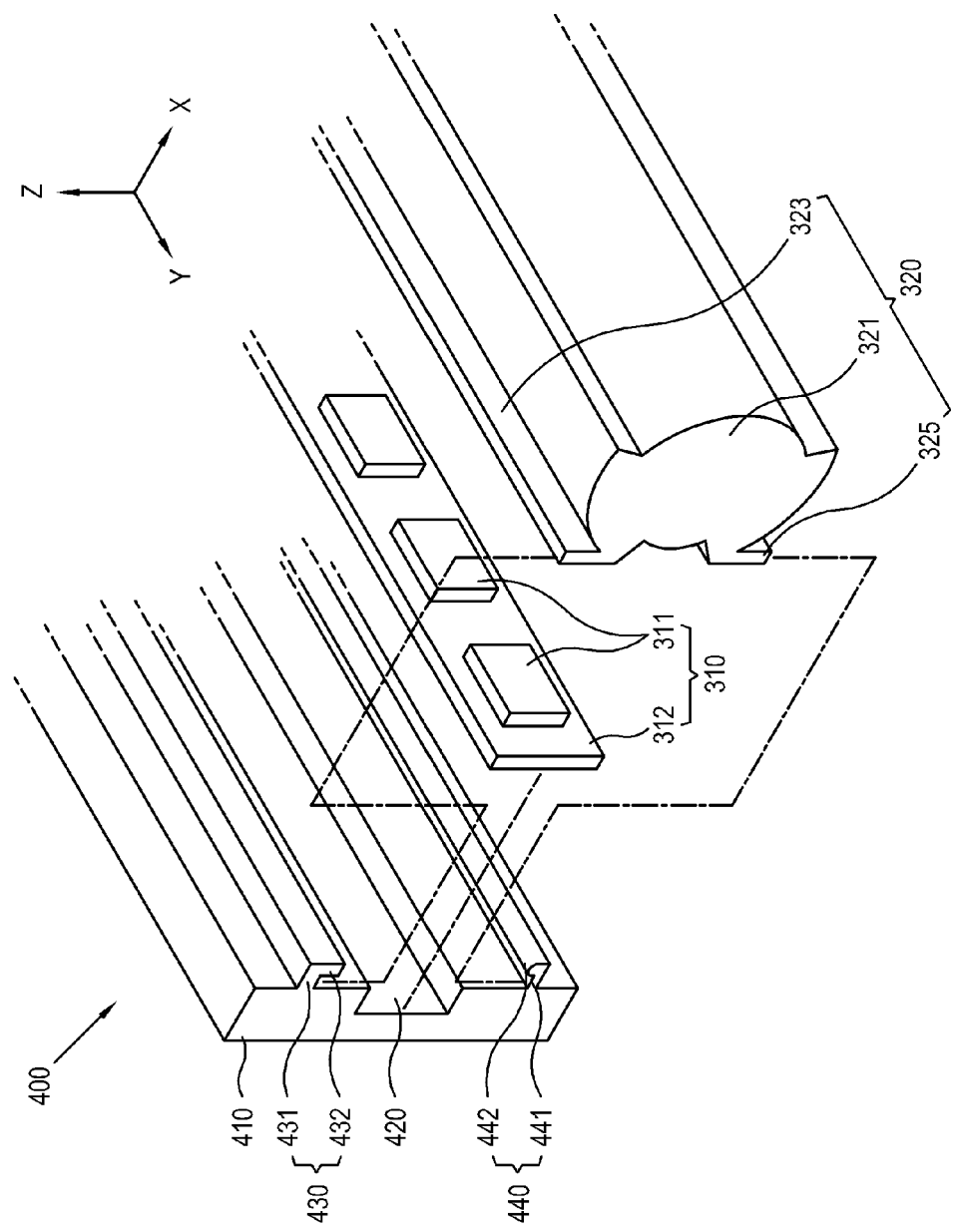
FIG. 2 is an enlarged perspective view of a light source module, a lens and a holder as main parts of the display apparatus in FIG. 1.

FIG. 1 is an exploded perspective view of a display apparatus 1 according to a first exemplary embodiment of the present invention. FIG. 2 is an enlarged perspective view of a light source module 310, a lens 320 and a holder 400 as main parts.

Directions in drawings have the following meanings: X refers to a transverse direction; Y refers to a vertical direction; and Z refers to a height direction. In drawings, the display panel 200 is disposed in a plane X-Y while the display panel 200 and a backlight unit 300 are layered in a direction Z. Opposition directions of directions X, Y and Z are directions −X, −Y and −Z. The plane X-Y means the plate surface which is formed by the axis of the direction X and the axis of the direction Y. Hereinafter, drawings and exemplary embodiments shall be described based on the foregoing definitions of the directions.

As shown in FIGS. 1 and 2, the display apparatus 1 according to the present exemplary embodiment includes covers 110 and 120 which form an accommodation space and an external appearance, a display panel 200 which is accommodated by the covers 110 and 120 and includes an image display surface on which an image is displayed, and a backlight unit 300 which is accommodated by the covers 110 and 120 and supplies light to the display panel 200 so that an image is displayed on the display panel 200.

The display apparatus 1 further include a panel support frame 130 which is accommodated by the covers 110 and 120 and supports the display panel 200 and an optical sheet 340, both of which will be described later.

The display apparatus 1 further includes a driving substrate (not shown) which drives the display panel 200, and an image processing board (not shown) which processes an image signal and controls the display panel 200 and the backlight unit 300 corresponding to the processing result. However, as the foregoing configuration is not directly related to the present exemplary embodiment, description thereof is omitted in the present exemplary embodiment to provide a clearer explanation and expression on the spirit of the present invention.

The covers 110 and 120 accommodate therein all of configurations of the display apparatus 1, and cover each edge in the four directions of up and down and left and right directions of a front surface of the display panel 200 and a rear surface of the display panel 200. If the direction where an image of the display panel 200 is displayed is referred to as a front surface and a direction opposite to the front surface is referred as a rear surface, the covers 110 and 120 include a front cover 110 and a rear cover 120 which cover the front and rear surfaces, respectively, of the display panel 200 and the backlight unit 300.

The front cover 110 includes an opening part which exposes an image display surface of the display panel 200 in the direction Z on a plate surface that is in parallel with the plane X-Y facing the display panel 200. The front cover 110 supports edges in four directions of the display panel 200 that is accommodated therein.

The rear cover 120 supports a reflection sheet 330 and a holder 400, which will be described later, on a plate surface that is in parallel with the plane X-Y facing the direction Z. Together with the front cover 110, the rear cover 120 has a sidewall that is located in edges in the directions X, −X, Y and −Y based on the display panel 200. During an assembly of the display apparatus 1, the sidewall prevents the display panel 200 and the backlight unit 300 from being separated from the display apparatus 1 to the direction in parallel with the plane X-Y.

According to the present exemplary embodiment, the display panel 200 includes a liquid crystal display (LCD) panel. The display panel 200 has a liquid crystal layer (not shown) which is interposed between two substrates (not shown), and a driving signal is applied to adjust an arrangement of the liquid crystal layer to thereby display an image on the display panel 200. The display panel 200 does not emit light itself, and receives light from the backlight unit 300 to display an image.

Upon receiving a driving signal from a driving substrate, liquid crystal of the display panel 200 rotates at a predetermined angle. As light transmissivity of each cell which consists of the image display area of the display panel 200 varies, an image is displayed on the image display surface.

The backlight unit 300 is provided in a rear/back surface of the display panel 200, supplies light and emits the light to the back surface of the display panel 200. The backlight unit 300 includes a light source module 310 which is provided in one of the edges in four directions of the display apparatus 1 and generates and emits light, a lens 320 which extends along the light source module 310 and collects and emits the light emitted by the light source module 310, a reflection sheet 330 which is provided in the back surface of the display panel 200 and reflects the light from the lens 320 to the display panel 200, and an optical sheet 340 which is layered in the back surface of the display panel 200 and adjusts the characteristic of the reflected light of the reflection sheet 330 and transmits the light to the display panel 200.

The light source module 310 and the lens 320 according to the present exemplary embodiment are described as installed in the edge in the direction −X of four directions of the covers 110 and 120, but this does not limit the spirit of the present invention. Alternatively, the light source module 310 and the lens 320 may be installed in edges in the direction X, Y or −Y or installed in at least two edges, respectively. The reflection sheet 330 is designed to have a different shape according to the installation configuration of the light source module 310 and 320.

The light source module 310 includes a plurality of light emitting elements 311 which is disposed in series sequentially in the direction Y, and a module substrate 312 which extends along the light emitting elements 311 and has the light emitting elements 311 installed therein for operation.

The light emitting elements 311 are realized as a light emitting diode (LED), and receive driving power and an operation control signal from the module substrate 312. The light emitting elements 311 may adjust the light emitting direction according to the method of installation in the module substrate 312. According to the present exemplary embodiment, a plate surface of the module substrate 312 wherein the light emitting elements 311 are mounted stands perpendicular to the plane X-Y in parallel with the image display surface of the display panel 200 and faces the direction X, and the light emitting elements 311 are mounted in the module substrate 312 to make the light emitting direction face the direction X.

The light emitting elements 311 may be discretely mounted in a single module substrate 312. The light emitting elements 311 which are mounted in the single module substrate 312 may include a blue LED, a green LED and a red LED, and form white light which has excellent color realization as the blue, green and red lights from the above LEDs are mixed. However, this is an exemplary embodiment, and the light emitting elements 311 may include a white LED that generates a white light by itself.

The module substrate 312 is formed by printing a circuit that is designed for operation of the light emitting elements 311, on a substrate that is elongated in the direction Y and is narrow in width. The module substrate 312 may have a configuration to be coupled to the holder 400 (to be described later) on the plate surface, e.g., a hole (not shown) to be coupled to a screw (not shown). The material of the module substrate 312 may include, without limitation, aluminum which has good heat conductivity, in consideration of heat dissipation of the light emitting elements 311.

The lens 320 is disposed in the light emitting direction of the light emitting elements 311 to be adjacent to the light source module 310 to thereby receive light from the light emitting elements 311. The lens 320 extends in the direction Y along the arrangement of the plurality of light emitting elements 311 so as to correspond therewith. The lens 320 collects light from the light emitting elements 311 and emits the light in the direction X toward a central area of the display apparatus 1. The lens 320 includes a collimator lens.

The lens 320 may be changed in design and have various shapes according to the characteristic of light required by the display apparatus 1. The lens 320 includes plastic or resin such as poly methyl methacrylate (PMMA). According to the present exemplary embodiment, the lens 320 is manufactured by extrusion molding.

If the lens 320 is manufactured by extrusion molding, a shape of a section of the lens 320 which is vertical to an extension direction of the lens 320, i.e., longwise direction is the same according to each lengthwise direction. That is, the lens 320 has the same section if it is cut in parallel with the plane X-Y along the direction Y as the lengthwise direction.

The lens 320 includes a lens main body 321 which collects and emits light, a first extension part 323 which extends in the direction Z from the lens main body 321, and a second extension part 325 which extends in the direction −Z from the lens main body 321. According to the present exemplary embodiment, the first and second extension parts 323 and 325 are expressed as extending in parallel with the axis of the direction Z, but may extend to form a predetermined angle against the axis of the direction Z.

The first and second extension parts 323 and 325 are mounted in and supported by the holder 400 (to be described later) so that the holder 400 supports the lens 320. This will be described in more detail later.

The reflection sheet 330 has a reflection surface that faces the back surface of the display panel 200. The reflection surface of the reflection sheet 330 has scattered reflection to uniformly transmit the light from the lens 320 to the display panel 200.

The reflection sheet 330 may vary in shape according to the configuration of the light source module 310 and the lens 320. For example, in the present exemplary embodiment, the reflection sheet 330 extends in the direction X as the light emitting direction of the lens 320. The farther the reflection sheet 320 is from the lens 320, the closer an inclination surface is formed by the reflection surface to the display panel 200. Then, the reflection sheet 330 may uniformly reflect the light from the lens 320 in the direction X to the display panel 200. This is an exemplary embodiment and the shape of the reflection sheet 330 may vary.

At least one optical sheet 340 is layered in the back surface of the display panel 200 to be in parallel with the display panel 200. The optical sheet 340 includes a prism sheet, diffusion sheet and a passivation film, and adjusts and transmits light emitted by the reflection sheet 330 to the display panel 200.

With the foregoing configuration, the display apparatus 1 according to the present exemplary embodiment displays an image on the display panel 200 by the light provided by the backlight unit 300. The display apparatus 1 includes the holder 400 that is accommodated by the covers 110 and 120 and supports the light source module 310 and the lens 320. Detailed configuration of the holder 400 will be described with reference to FIG. 2.

As shown therein, the holder 400 is disposed in an edge in the direction −X of the covers 110 and 120, and is elongated so as to extend in the direction Y. The holder 400 is disposed in the direction −X which is an opposite direction of the direction X based on the light source module 310 and the lens 320 so that it does not interrupt with the light emission of the light source module 310 and the lens 320.

The holder 400 includes a holder main body 410, a light emitting element accommodator 420 which accommodates and supports the light emitting elements 311 and the light source module 310, a first lens supporter 430 which supports the first extension part 323 to couple the lens 320 to the holder 400 and to make the lens 320 to be supported by the holder 400, and a second lens supporter 440 which supports the second extension part 325 to couple the lens 320 to the holder 400 and to make the lens 320 to be supported by the holder 400. The light emitting element accommodator 420, and the first and second lens supporters 430 and 440 extend in the direction Y corresponding to the light source module 310 and the lens 320.

The holder main body 410 is supported by at least one of the covers 110 and 120 and the panel support frame 130. The holder main body 410 includes aluminum to improve manufacturing, assembly and heat dissipation. The holder main body 410 may be manufactured by extrusion molding.

The light emitting element accommodator 420 is formed in the direction X of the holder main body 410. The light emitting element accommodator 420 accommodates and supports the light source module 310 including the light emitting elements 311 and the module substrate 312. The light emitting element accommodator 420 may have a hole (not shown) to couple the module substrate 312 by screw (not shown) or a groove to press-insert the module substrate 312 therein.

The first lens supporter 430 includes a first supporter main body 431 which extends in the direction X from the holder main body 410, and a first supporter step 432 which extends in the direction –Z from an end part of the first supporter main body 431.

The first supporter main body 431 extends from the direction X of the holder main body 410 to a location spaced from the light emitting element accommodator 420 in the direction Z.

The first supporter step 432 extends in the direction –Z from an end part of the direction X of the first supporter main body 431. Then, the first supporter main body 431 and the first supporter step 432 form an accommodation space to accommodate therein the first extension part 323 of the lens 320.

The second lens supporter 440 includes a second supporter main body 441 which extends from the holder main body 410 in the direction X, and a second supporter hook 442 which protrudes from an end part of the second supporter main body 441 in the direction Z.

The second supporter main body 441 extends from the direction X of the holder main body 410 to a location spaced in the direction –Z from the light emitting element accommodator 420. The second supporter main body 441 may elastically move, rotate or be deformed with respect to the holder main body 410 when external force at a preset level applies.

The second supporter hook 442 protrudes from an end part of the direction X of the second supporter main body 441 to the direction Z. Then, the second supporter main body 441 and the second supporter hook 442 form an accommodation space to accommodate therein the second extension part 325 of the lens 320.

The gap between the first supporter main body 431 and the second supporter main body 441, the gap between the holder main body 410 and the first supporter step and the gap between the holder main body 410 and the second supporter hook 442 are determined corresponding to the size and shape of the first and second extension parts 323 and 325 of the lens 320. That is, the foregoing gaps may not be defined in certain numbers, and may vary to the extent that the lens 320 is coupled to and supported by the holder 400.

With the foregoing configuration of the holder 400, the method of mounting the lens 320 in the holder 400 will be described with reference to FIGS. 3 and 4.

Figure 3:
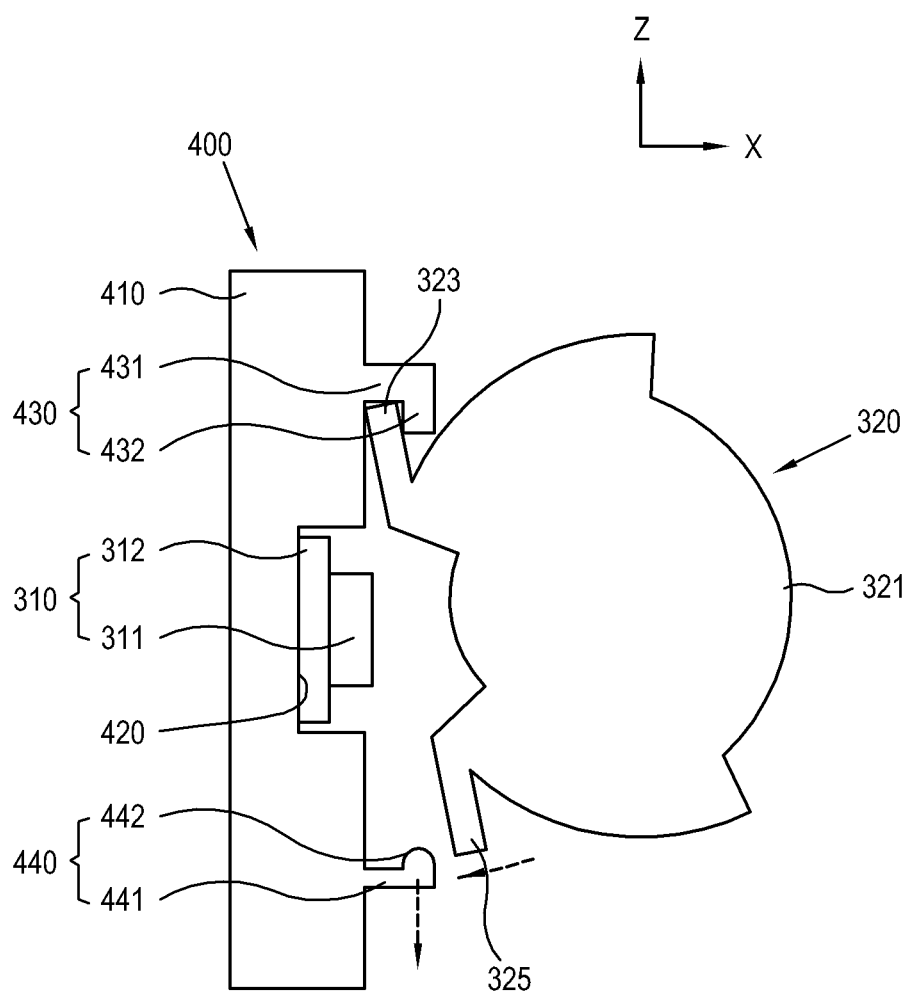
FIGS. 3 and 4 are lateral sectional views of the lens which is mounted in the holder of the display apparatus in FIG. 1.
Figure 4:
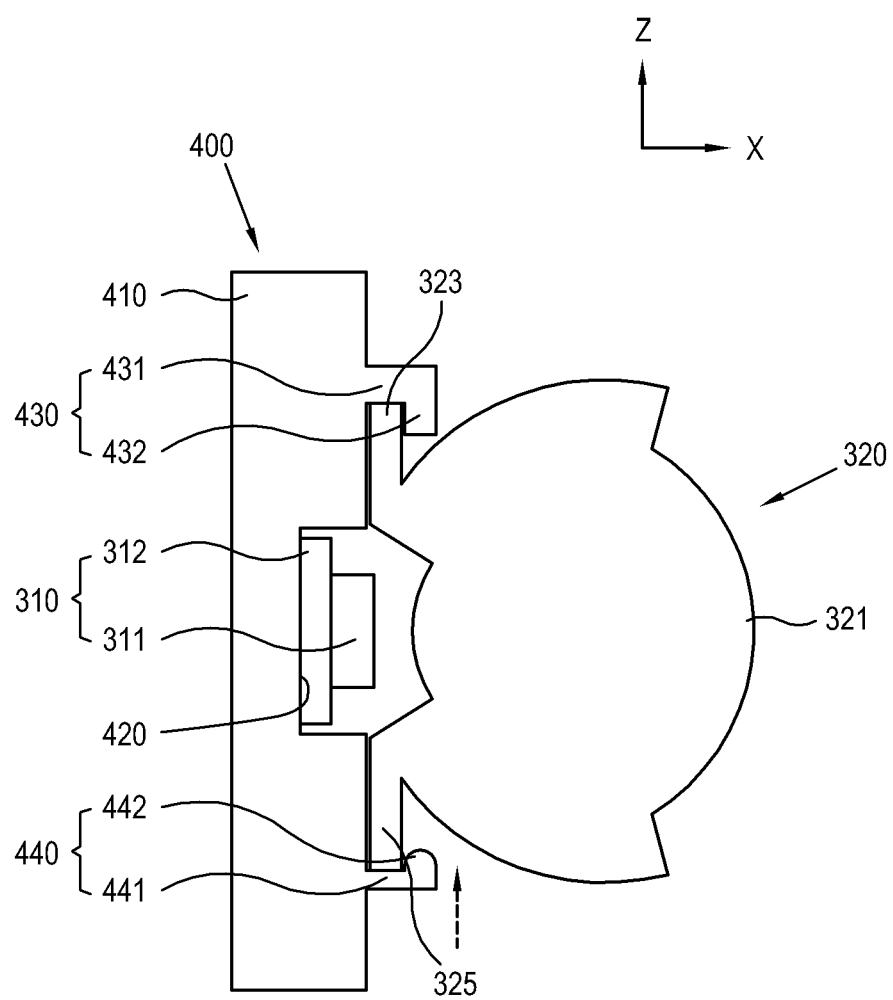

FIGS. 3 and 4 are lateral sectional views of the lens 320 that is mounted in the holder 400.

As shown in FIG. 3, while the light source module 310 is supported by the light emitting element accommodator 420, a user accommodates the first extension part 323 in the accommodation space of the first lens supporter 430. While the first extension part 323 is accommodated in the first lens supporter 430, a user applies external force to the lens 320 in the direction –X.

Due to the external force applying to the direction –X, the second extension part 325 rotates and presses the second supporter hook 442 by using the first extension part 323 accommodated in the first lens supporter 430 as a shaft (i.e., a point of rotation). The second extension part 325 contacts and presses the second supporter hook 442, and the second supporter main body 331 elastically rotates in the direction –X by the pressure. The second extension part 325 approaches and moves to the holder main body 410 according to the rotation of the second supporter main body 441.

As the first supporter main body 431 does not elastically move to the holder main body 410 even by the external force, the second extension part 325 may rotate by using, as the shaft, the first extension part 323 accommodated in the first lens supporter 430.

The second supporter hook 442 is round at a contact area contacting the second extension part 325 and contributes to an easy movement of the second extension part 325.

As shown in FIG. 4, if the second extension part 325 is accommodated in the accommodation space of the second lens supporter 440 and releases the pressure to the second supporter hook 442, the second supporter main body 441 returns to its original position. The second supporter hook 442 prevents the second extension part 325 from being separated from the second lens supporter 440. Then, the lens 320 is mounted in and supported by the holder 400.

According to the present exemplary embodiment, the lens 320 may be coupled to and supported by the holder 400 with a simple configuration without employing a coupling configuration with an additional screw.

Hereinafter, the coupling configuration of the display apparatus 1 according to the present exemplary embodiment will be described with reference to FIG. 5.

Figure 5:
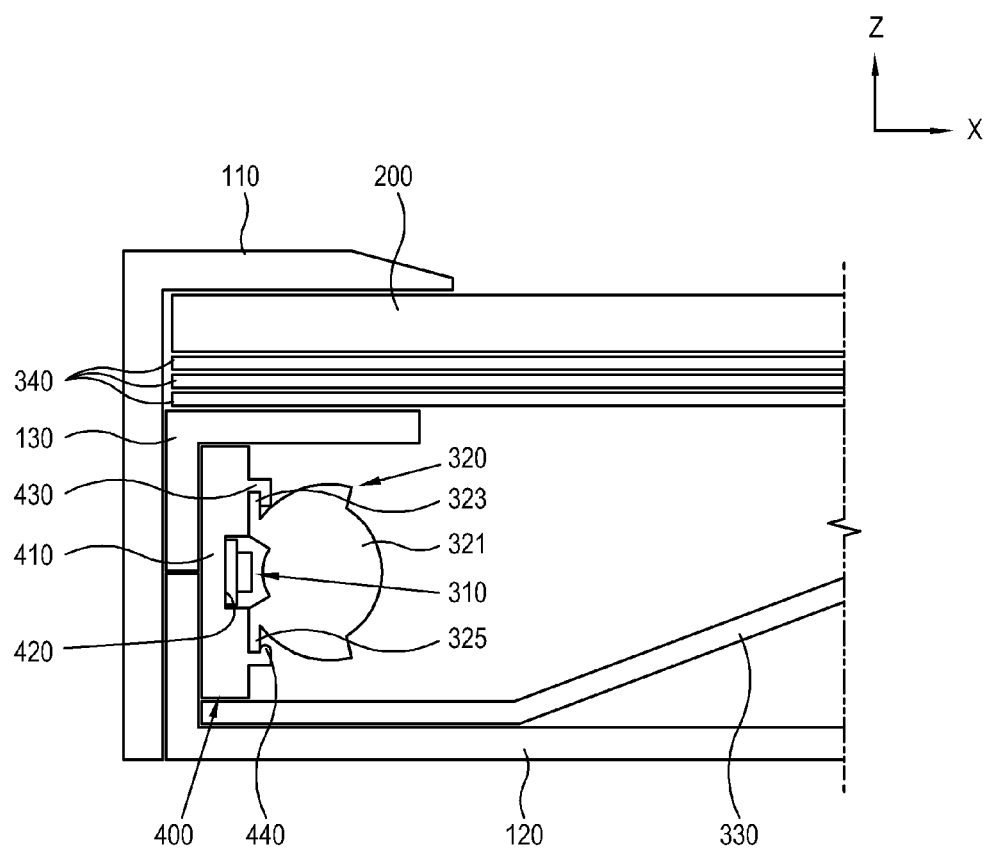
FIG. 5 is a lateral sectional view of the display apparatus in FIG. 1 in a coupling state.

FIG. 5 is a lateral sectional view of the display apparatus 1 in a coupling state.

As shown therein, in the accommodation space which is formed by the front and rear covers 110 and 120, the display panel 200 and the optical sheet 340 are layered on a top in the direction Z, and supported by the panel supporting frame 130.

The holder 400 is interposed between the panel supporting frame 130 and the rear cover 120. According to the present exemplary embodiment, the holder 400 is an individual configuration that is separated from the panel supporting frame 130, but not limited thereto. Alternatively, the holder 400 and the panel supporting frame 130 may be provided as an integral configuration. The holder 400 is disposed so that the configuration of the light emitting element accommodator 420, the first lens supporter 430 and the second lens supporter 440 are toward the direction X, i.e., face the internal side of the display apparatus 1.

The reflection sheet 330 is supported on the rear cover 120 to face the display panel 200.

The light emitting element accommodator 420 of the holder 400 supports the module substrate 312 so that the light from the light emitting elements 311 is emitted in the direction X. The first and second lens supporters 430 and 440 support the lens 320 to dispose the lens 320 adjacently to the light source module 310 along the light emitting direction.

With the foregoing configuration, the light which is emitted by the light emitting elements 311 is collected through the lens 320 and emitted in the direction X. The light which is emitted by the lens 320 is scattered and reflected by the reflection sheet 330 and passes through the optical sheet 340. After the characteristic of the light is adjusted by the optical sheet 340, the light is transmitted to the display panel 200.

Heat which is generated by the light source module 310 is radiated to the outside of the display apparatus 1 through the holder 400 and the covers 110 and 120. The holder 400 may transmit heat quickly as it includes aluminum. As the holder 400 is disposed in the edge of the covers 110 and 120, the strength of the edges of the display apparatus 1 improves.

As described above, the display apparatus 1 according to the present exemplary embodiment includes the holder 400 to/by which the light source module 310 and the lens 320 are coupled and supported, by a simple configuration. The application of the holder 400 makes the manufacturing process of the display apparatus 1 simple, and contributes to the improvement of productivity.

The holder 400 is not limited to that according to the foregoing exemplary embodiment, and may vary. Hereinafter, a holder 500 having a different configuration from that according to the first exemplary embodiment will be described in detail.

Figure 6:
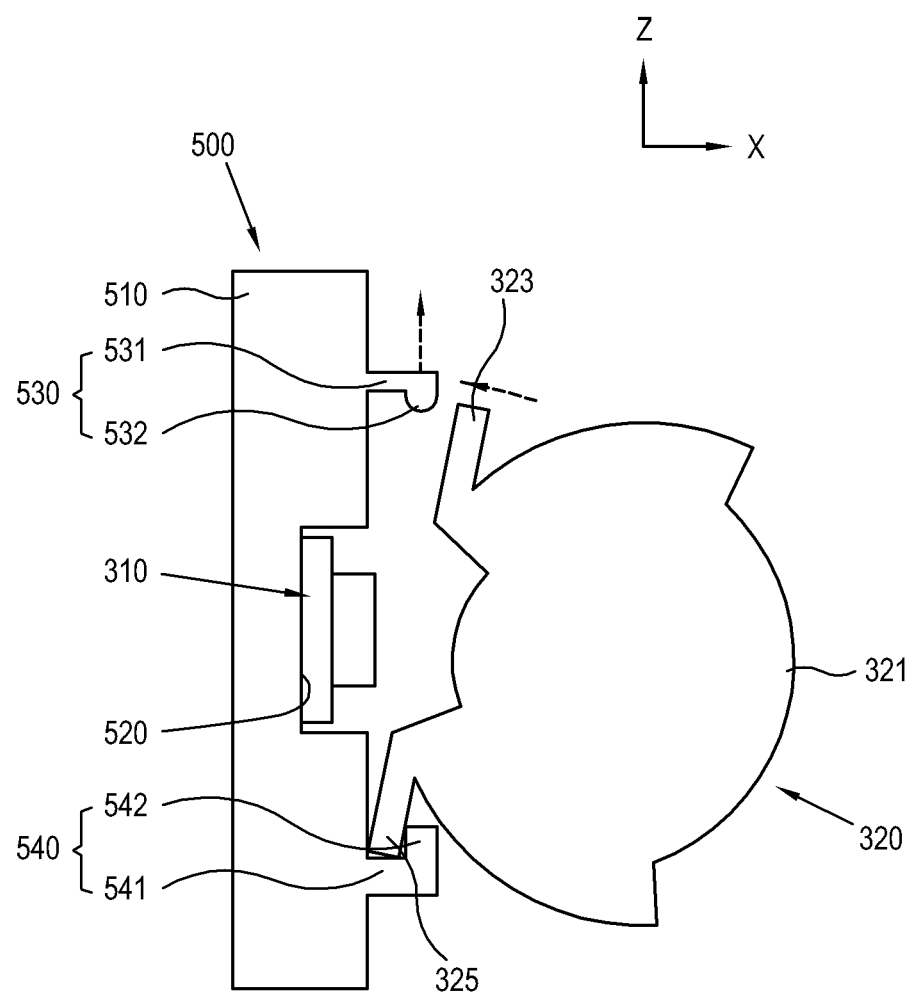
FIG. 6 is a lateral sectional view of a lens which is mounted in a holder of a display apparatus according to a second exemplary embodiment of the present invention.

FIG. 6 is a lateral sectional view of a lens 320 which is mounted in a holder 500 of the display apparatus 1 according to a second exemplary embodiment of the present invention.

As shown therein, the holder 500 according to the present exemplary embodiment includes a holder main body 510, a light emitting element accommodator 520, a first lens supporter 530 and a second lens supporter 540. The configuration of the holder main body 510 and the light emitting element accommodator 520 according to the present exemplary embodiment may employ the configuration according to the first exemplary embodiment. Thus, detailed description will be omitted.

The first lens supporter 530 includes a first supporter main body 531 which extends from the holder main body 510 in the direction X, and a first supporter hook 532 which protrudes from an end part of the first supporter main body 531 in the direction −Z.

The first supporter main body 531 extends from the direction X of the holder main body 510 to a location spaced in the direction −Z from the light emitting element accommodator 520. The first supporter main body 531 may elastically move, rotate or be deformed with respect to the holder main body 510 when external force at a preset level applies.

The first supporter hook 532 protrudes from an end part of the direction X of the first supporter main body 531 to the direction −Z. Then, the first supporter main body 531 and the first supporter hook 532 form an accommodation space to accommodate therein the first extension part 323 of the lens 320.

The second lens supporter 540 includes a second supporter main body 541 which extends from the holder main body 510 in the direction X, and a second supporter step 542 which extends from an end part of the second supporter main body 541 in the direction Z.

The second supporter main body 541 extends from the direction X of the holder main body 510 to a location spaced in the direction −Z from the light emitting element accommodator 520.

The second supporter step 542 extends from an end part of the direction X of the second supporter main body 541 to the direction Z. Then, the second supporter main body 541 and the second supporter step 542 form an accommodation space to accommodate therein the second extension part 325 of the lens 320.

With the foregoing configuration, the method of mounting the lens 320 in the holder 500 is as follows.

While the light source module 310 is supported by the light emitting element accommodator 520, a user accommodates the second extension part 325 in the accommodation space of the second lens supporter 540. While the second extension part 325 is accommodated in the second lens supporter 540, a user applies external force to the lens 320 in the direction −X.

Due to the external force applying to the direction −X, the first extension part 323 rotates and presses the first supporter hook 532 by using the second extension part 325 accommodated in the second lens supporter 540 as a shaft by which to rotate. The first supporter main body 531 rotates in the direction Z by the pressure. The first extension part 323 approaches and moves to the holder main body 510 according to the rotation of the first supporter main body 531.

As the second supporter main body 541 does not elastically move to the holder main body 510 by the external force, the first extension part 323 may rotate by using the second extension part 325 accommodated in the second lens supporter 540, as a shaft.

The first supporter hook 532 is round at a contact area contacting the first extension part 323 and to facilitate movement of the first extension part 323 over the first supporter hook 532.

If the first extension part 323 is accommodated in the accommodation space of the first lens supporter 530 and releases the pressure to the first supporter hook 532, the first supporter main body 531 returns to its original position. The first supporter hook 532 prevents the first extension part 323 from being separated from the first lens supporter 530. Then, the lens 320 is mounted in and supported by the holder 400.

Figure 7:
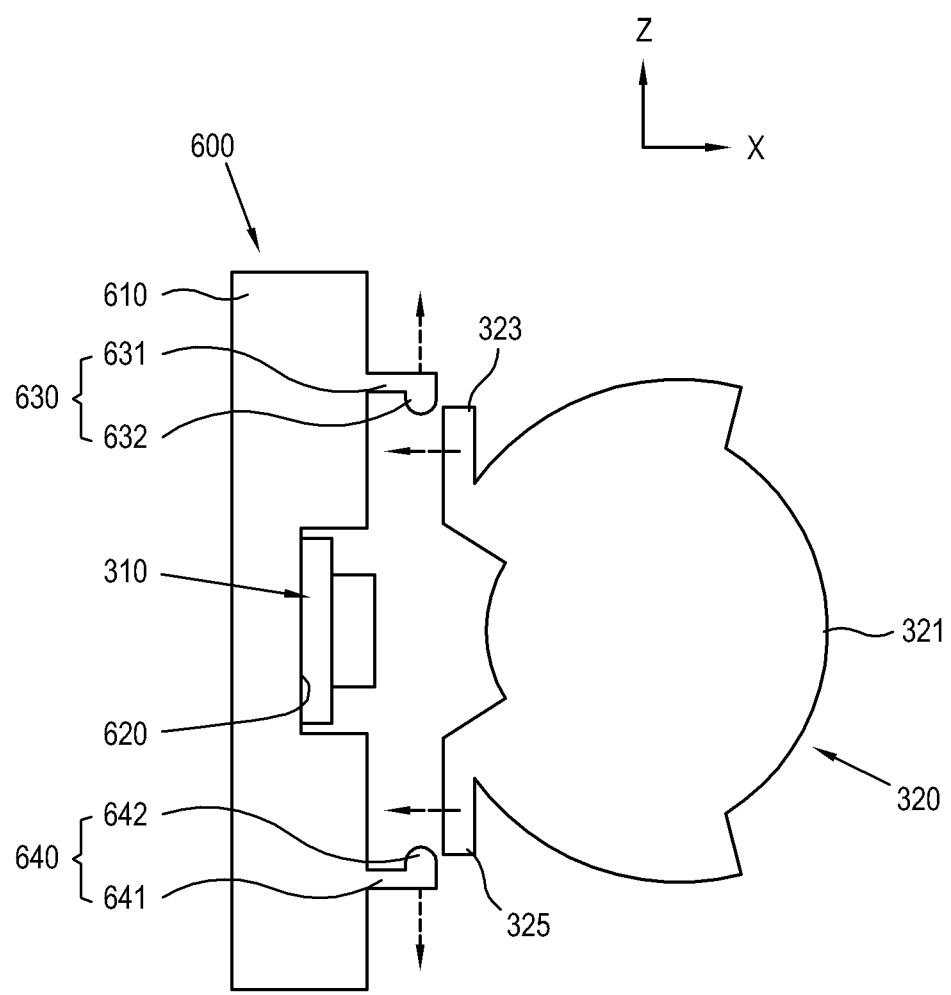
FIG. 7 is a lateral sectional view of a lens which is mounted in a holder of a display apparatus according to a third exemplary embodiment of the present invention.

FIG. 7 is a lateral sectional view of a lens 320 which is mounted in a holder 600 of a display apparatus 1 according to a third exemplary embodiment of the present invention.

As shown therein, the holder 600 according to the present exemplary embodiment includes a holder main body 610, a light emitting element accommodator 620, a first lens supporter 630 and a second lens supporter 640. The configuration of the holder main body 610 and the light emitting element accommodator 620 according to the present exemplary embodiment may employ those according to the first and second exemplary embodiments. Thus, detailed description will be avoided.

The first lens supporter 630 includes a first supporter main body 631 which extends from the holder main body 610 in the direction X, and a first supporter hook 632 which protrudes from an end part of the first supporter main body 631 in the direction Z.

The first supporter main body 631 extends from the direction X of the holder main body 610 to a location spaced in the direction Z from the light emitting element accommodator 620. The first supporter main body 631 may elastically move, rotate or be deformed with respect to the holder main body 610 when external force at a preset level applies.

The first supporter hook 632 protrudes from an end part of the direction X of the first supporter main body 631 to the direction −Z. Then, the first supporter main body 631 and the first supporter hook 632 form an accommodation space to accommodate therein the first extension part 323 of the lens 320.

The second lens supporter 640 includes a second supporter main body 641 which extends from the holder main body 610 in the direction X, and a second supporter hook 642 which protrudes from an end part of the second supporter main body 641 in the direction Z.

The second supporter main body 641 extends from the direction X of the holder main body 610 to a location spaced in the direction −Z from the light emitting element accommodator 620. The second supporter main body 641 may elastically move, rotate or be deformed with respect to the holder main body 610 when external force at a preset level applies.

The second supporter hook 642 protrudes from an end part of the direction X of the second supporter main body 641 to the direction Z. Then, the second supporter main body 641 and the second supporter hook 642 form an accommodation space to accommodate therein the second extension part 325 of the lens 320.

With the foregoing configuration, the method of mounting the lens 320 in the holder 600 is as follows.

A user applies the external force to the lens 320 in the direction −X. Due to the external force, the first and second extension parts 323 and 325 contact and press the first and second supporter hooks 632 and 642, respectively. The first and second supporter main bodies 631 and 641 rotates in the directions Z and −Z, respectively, to the holder main body 610 due to the pressure, and allow the first and second extension parts 323 and 325 to enter between the first and second lens supporters 630 and 640.

The first and second supporter hooks 632 and 642 are round at a contact area contacting the first and second extension parts 323 and 325 and contribute to an easy movement of the first and second extension parts 323 and 325. As such, the lens 320 can be easily snap-fit into place.

If the first and second extension parts 323 and 325 are accommodated in the accommodation space between the first and second supporter main bodies 631 and 641 to release the pressure to the first and second supporter hooks 632 and 642, the first and second supporter main bodies 631 and 641 return to their original positions. The first supporter hook 632 prevents the first extension part 232 from being separated from the first lens supporter 630 while the second supporter hook 642 prevents the second extension part 325 from being separated from the second lens supporter 640. Thus, the lens 320 is mounted in and supported by the holder 600.

Figure 8:
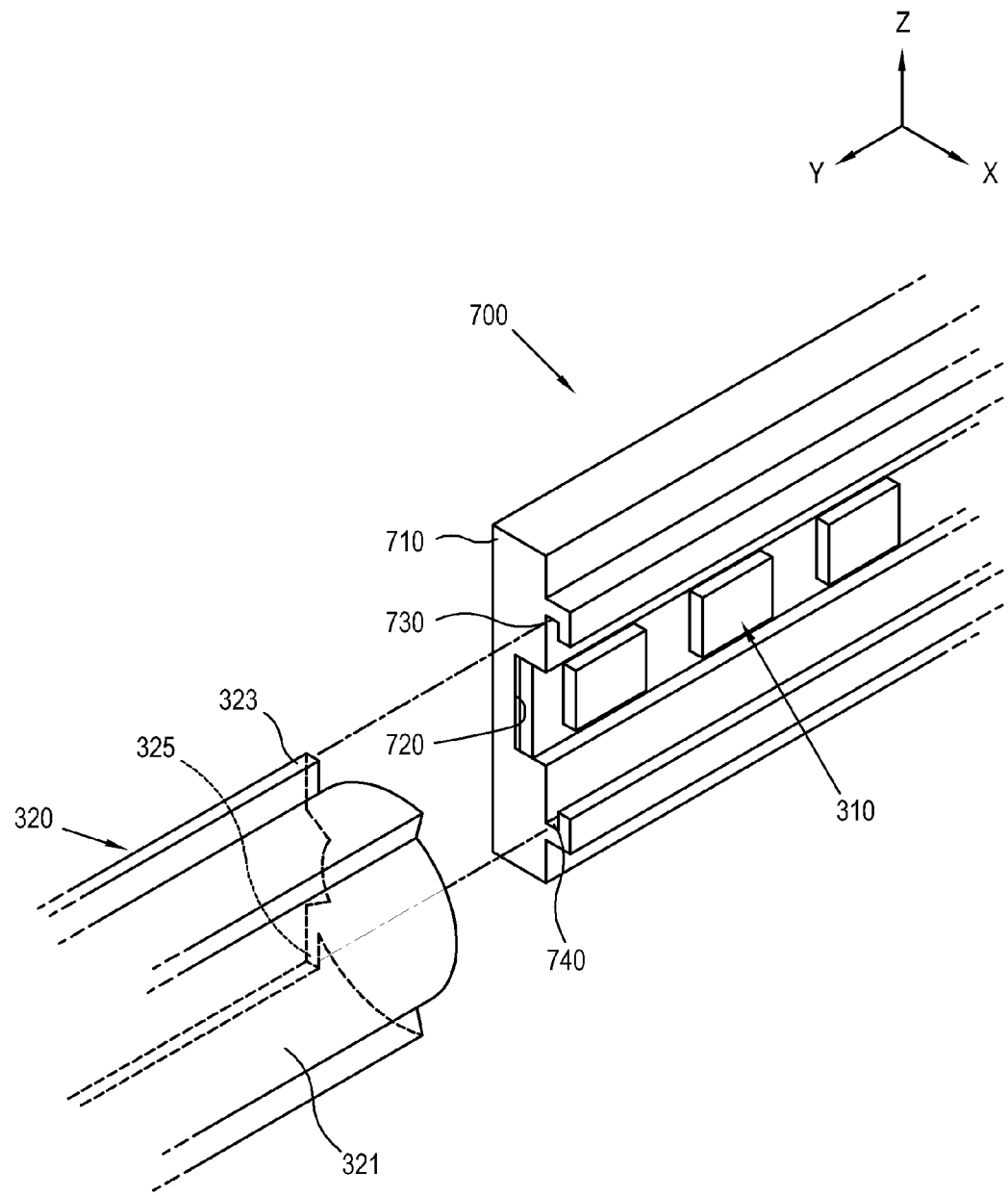
FIG. 8 is a perspective view of a lens which is mounted in a holder of a display apparatus according to a fourth exemplary embodiment of the present invention.
Figure 9:
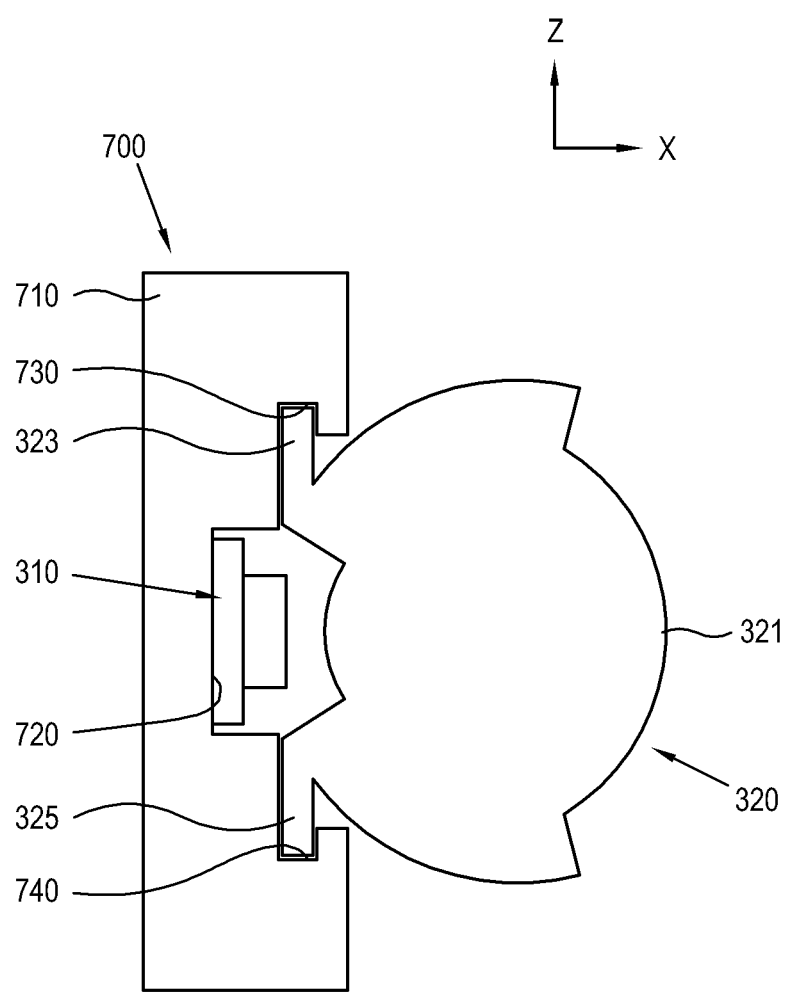
FIG. 9 is a lateral sectional view of the holder to which the lens is coupled in FIG. 8.

FIG. 8 is a perspective view of a lens 320 which is mounted in a holder 700 of a display apparatus 1 according to a fourth exemplary embodiment of the present invention. FIG. 9 is a lateral sectional view of the lens 320 which is coupled to the holder 700 according to the present exemplary embodiment.

As shown therein, the holder 700 according to the present exemplary embodiment includes a holder main body 710, a light emitting element accommodator 720, a first lens supporter 730, and a second lens supporter 740. The configuration of the holder main body 710 and the light emitting element accommodator 720 according to the present exemplary embodiment may employ those according to the first to third exemplary embodiments. Thus, detailed description will be omitted.

If the lens 320 is manufactured by extrusion molding, a section of the lens 320 which is vertically cut in a lengthwise direction, i.e., in the direction Y has the same shape in the lengthwise direction. That is, the first and second extension parts 323 and 325 of the lens 320 have the same section in parallel with the plane X-Y along the direction Y.

Corresponding to the foregoing, first and second lens supporters 730 and 740 are realized as a space that extends corresponding to the shape of the section of the first and second extension parts 323 and 325 in the lengthwise direction of the holder main body 710, i.e., in the direction Y. The first and second lens supporters 730 and 740 communicate with the outside through one of opposite end parts of the holder main body 710 in the lengthwise direction.

With the foregoing configuration, a user enters the first and second extension parts 323 and 325 to the first and second lens supporters 730 and 740 through the communication area formed in the end part of the holder main body 710. The first and second extension parts 323 and 325 slidably move within the first and second lens supporters 730 and 740 in the direction −Y and accommodated in and supported by the first and second lens supporters 730 and 740.

By the foregoing method, the lens 320 is mounted in and supported by the holder 700 by being slid therein.

In the foregoing exemplary embodiments, various embodiments of the holders 400, 500, 600 and 700 have been descried. The foregoing exemplary embodiments relate to the supporting structure of the holder 800 for the lens 320, but the holder 800 may be realized in a different manner from those according to the foregoing exemplary embodiments. Hereinafter, the exemplary embodiments of the holder 800 will be described with reference to FIG. 10.

Figure 10:
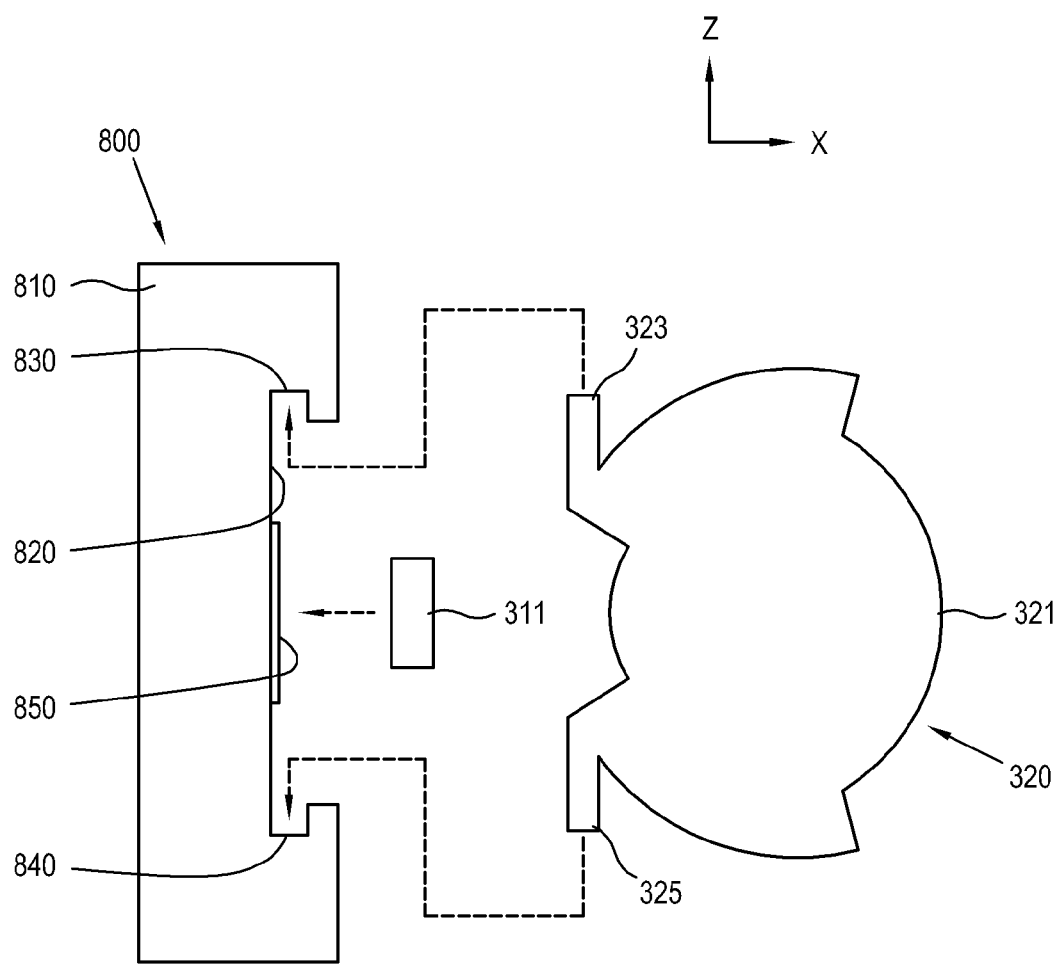
FIG. 10 is a lateral sectional view of a light emitting element and a holder of a display apparatus according to a fifth exemplary embodiment of the present invention.

FIG. 10 is a lateral sectional view of a light emitting element 311 and a holder 800 of a display apparatus 1 according to a fifth exemplary embodiment of the present invention.

As shown therein, the holder 800 according to the present exemplary embodiment includes a holder main body 810, a light emitting element accommodator 820, a first lens supporter 830 and a second lens supporter 840. The configuration of the holder main body 810, the first lens supporter 830 and the second lens supporter 840 according to the present exemplary embodiment may employ the configuration according to the fourth exemplary embodiment, or other exemplary embodiments.

A circuit 850 is printed in a plate surface of the light emitting element accommodator 820 facing the direction X to operate the light emitting element 311. The circuit 850 is provided to directly mount the light emitting element 311 therein. That is, in the foregoing exemplary embodiments, the light source module 310 is realized by mounting a plurality of light emitting elements 311 in the module substrate 312 (refer to FIG. 2). However, in the present exemplary embodiment, the circuit 850 which is formed on the module substrate 312 is formed on the light emitting element accommodator 820, and the light emitting element 311 is directly mounted in the holder 800 without the module substrate 312.

Thus, fewer parts may be used and the heat from the light emitting element 311 may be dissipated more efficiently through the holder 800.

The aforementioned exemplary embodiment may apply to a display apparatus 900 which is realized as various forms. Hereinafter, if the display apparatus 900 includes a TV, an application of the present invention will be described with reference to FIG. 11.

Figure 11:
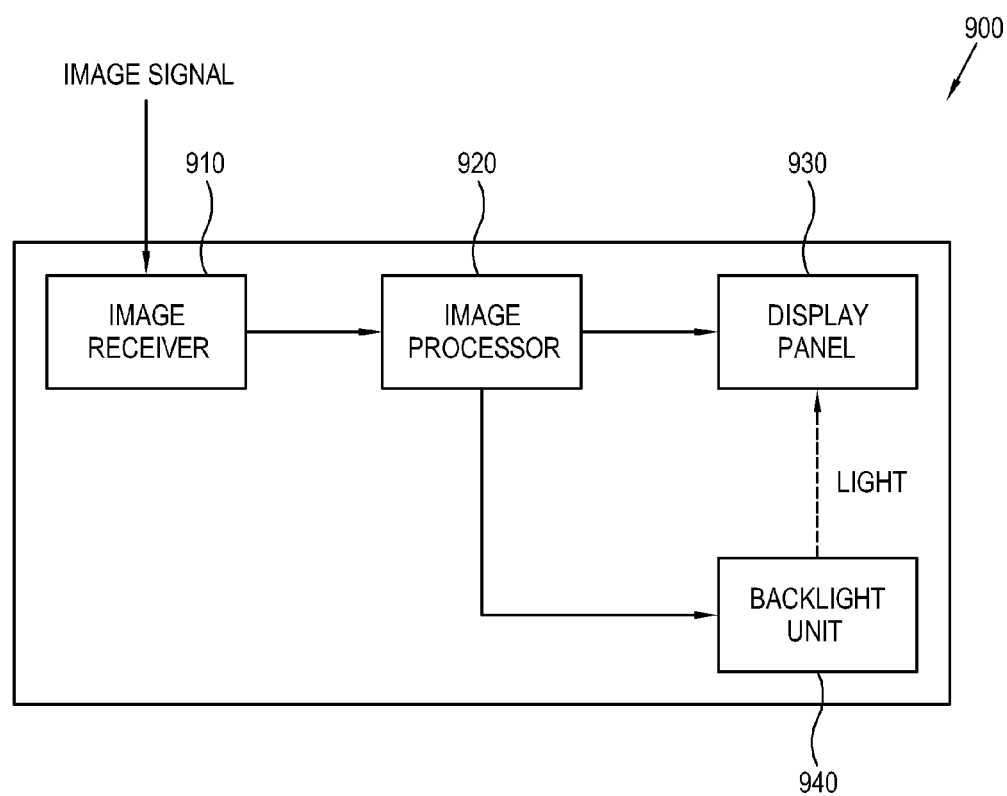
FIG. 11 is a block diagram of a display apparatus according to a sixth exemplary embodiment of the present invention.

FIG. 11 is a block diagram of a display apparatus 900 according to a sixth exemplary embodiment. In FIG. 11, a solid line means a transmission of an image signal or control signal and a dotted line means a transmission of light.

As shown therein, the display apparatus 900 according to the present exemplary embodiment includes an image receiver 910 which receives an image signal from the outside, an image processor 920 which processes an image signal that is transmitted to the image receiver 910, a display panel 930 which displays an image thereon with the image signal processed by the image processor 920 and a backlight unit 940 which supplies light to display an image on the display panel 930.

The image receiver 910 may receive an image signal/image data in a wired/wireless manner, transmits the image signal to the image processor, and vary corresponding to the standard of the received image signal. For example, the image receiver 110 may receive an image signal in the format of radio frequency (RF) signal, composite/component video, super video, SCART, high definition multimedia interface (HDMI), display port, unified display interface (UDI) or wireless HD.

The image processor 920 performs various preset image processing operations for an image signal, outputs the processed image signal to the display panel 930 and displays an image on an image display surface of the display panel 930. The processes performed by the image processor 920 may include, but not limited to, decoding, deinterlacing, frame refresh rate converting, scaling, noise-reducing for improvement of picture quality and detail enhancing operations corresponding to various image formats.

The image receiver 910 and the image processor 920 may include an image processing board (not shown) which is built in the display apparatus 900.

The configuration of the display panel 930 and the backlight unit 940 is substantially the same as the configuration of the foregoing exemplary embodiments. The holder which supports the foregoing configuration may employ the configuration according to the foregoing exemplary embodiments. Thus, detailed description will be omitted.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
   a cover;
   a display panel which is accommodated in the cover;
   a plurality of light emitting elements arranged in at least one edge of the cover at a side of a rear surface of the display panel;
   a lens which extends in parallel with an arrangement direction of the light emitting elements and is arranged in a light emitting direction of the light emitting elements to receive light from the light emitting elements;
   a reflection sheet which is installed at the rear surface of the display panel and reflects light from the lens to the display panel; and
   a holder which comprises a holder main body that extends along the at least one edge, a light emitting element accommodator that is formed in a surface of the holder main body to accommodate therein the light emitting elements, and a lens supporter that is spaced from the light emitting element accommodator and protrudes from a surface of the holder main body that faces the light emitting direction to couple and support the lens,
   wherein the lens supporter comprises:
      a first supporter configured to support one portion of the lens; and
      a second supporter configured to support an other portion of the lens,
      the first supporter comprises:
         a first supporter main body extending, in a first direction that is the same as the light emitting direction, from the surface of the holder main body that faces the light emitting direction, and
         a first supporter hook protruding from the first supporter main body in a second direction that is different from the first direction,
      the second supporter comprises:
         a second supporter main body extending, in the first direction, from the surface of the holder main body that faces the light emitting direction, and
         a second supporter hook protruding from the second supporter main body in a third direction that is opposite to the second direction; and
      each of the first supporter main body and the second supporter main body is configured to elastically move by a pressure of the lens due to an external force to mount the lens to the holder.

2. The display apparatus according to claim 1, wherein the lens comprises a lens main body, a first extension part which extends from the lens main body in the third direction, which faces the display panel, and a second extension part which extends in the second direction that is opposite to the third direction, wherein the first supporter supports the first extension part and the second supporter supports the second extension part.

3. The display apparatus according to claim 2, wherein the second supporter main body elastically moves from the holder main body by a pressure of the second extension part due to an external force when the lens is mounted in the lens supporter in a fourth direction that is opposite to the first direction by the external force.

4. The display apparatus according to claim 3, wherein the second supporter hook is rounded at a contact area contacting the second extension part when the lens is mounted.

5. The display apparatus according to claim 3, wherein the first supporter main body elastically moves from the holder main body by pressure of the first extension part by an external force when the lens is mounted in the lens supporter in the fourth direction by the external force.

6. The display apparatus according to claim 5, wherein the first supporter hook is rounded at a contact area contacting the first extension part when the lens is mounted.

7. The display apparatus according to claim 2, wherein the first supporter main body elastically moves from the holder main body by pressure of the first extension part due to an external force when the lens is mounted in the lens supporter in a fourth direction that is opposite to the first direction by the external force.

8. The display apparatus according to claim 2, wherein the first and second supporters form an accommodation space that extends to accommodate the first and second extension parts in a lengthwise direction of the holder main body and comprises an area that communicates with the outside through at least one of opposite end parts of the holder main body in the lengthwise direction, and the first and second extension parts slide along the lengthwise direction through the communication area and are mounted in the first and second supporters.

9. The display apparatus according to claim 8, wherein the lens comprises a lens that is formed by extrusion molding and a shape of a section of the lens that is vertical to a lengthwise direction is the same along the lengthwise direction.

10. The display apparatus according to claim 1, further comprising a printed circuit board which is mounted to operate the plurality of light emitting elements, and
    the printed circuit board coupled to the light emitting element accommodator by screw.

11. The display apparatus according to claim 1, wherein the light emitting element accommodator has a circuit printed in a plate surface to operate the plurality of light emitting elements, and the plurality of light emitting elements is mounted in the plate surface of the light emitting element accommodator where the circuit is printed.

12. The display apparatus according to claim 1, further comprising an image receiver which receives an image signal, and an image processor which processes an image signal that is transmitted to the image receiver, to be displayed on the display panel as an image.

13. The display apparatus according to claim 1, wherein the cover includes a front cover and a rear cover, and further comprising a panel supporting frame disposed inside the cover, so that the holder is accommodated between the rear cover and a rear surface of the panel supporting frame, and the display panel is interposed between the front cover and a front surface of the panel supporting frame.

14. The display apparatus according to claim 1, wherein the first supporter hook is integrally formed with the first supporter main body, and the second supporter hook is integrally formed with the second supporter main body.

15. A backlight unit of a display apparatus comprising:
a lens which extends in parallel with an arrangement direction of a plurality of light emitting elements, in a light emitting direction of the light emitting elements so as to receive light from the light emitting elements, the lens including a first lens extension part and a second lens extension part; and
a holder for holding the lens and the light emitting elements, the holder extending in parallel with the light emitting elements and the lens, the holder comprising:
a holder main body,
a light emitting element accommodator that accommodates the light emitting elements therein,
a first lens supporter extending from a surface of the holder main body that faces the light emitting direction, defining a first space between the holder main body and the first lens supporter, for receiving the first lens extension part, the first lens supporter comprising:
a first supporter main body extending, a first direction that is the same as the light emitting direction, from the surface of the holder main body that faces the light emitting direction; and
a first supporter hook protruding from the first supporter main body in a second direction that is different from the first direction,
a second lens supporter extending from the surface of the holder main body that faces the light emitting direction, defining a second space between the holder main body and the first lends supporter, for receiving the second lens extension part, the second lens supporter comprising:
a second supporter main body extending, in the first direction, from the surface of the holder main body that faces the light emitting direction, and
a second supporter hook protruding from the second supporter main body in a third direction that is opposite to the second direction;
wherein, when the first lens extension part is received in the first space, the first lens extension part is configured to serve as a point of rotation while the second lens extension part is snap fit into the second space,
wherein at least one of the first lens supporter and the second lens supporter is configured to elastically move by a pressure of the lens due to an external force so that the lens is mounted to the holder.

16. The backlight unit of the display apparatus according to claim 15, wherein the second supporter hook is deformable and has a rounded edge for contacting the second lens extension part while the second lens extension part is being snap fit into the second space.

17. The backlight unit of the display apparatus according to claim 15, wherein the lens comprises a lens main body, and the first lens extension part extends from the lens main body in the third direction, which faces the display panel, and the second lens extension part extends from the lens main body in the second direction that is opposite to the third direction, and
the second supporter main body elastically moves in the second direction by a pressure force of the second lens extension part being applied to the second supporter main body in the second direction that is opposite to the third direction, as the second lens extension part is snap fit into the second space.

18. The backlight unit of a display apparatus according to claim 15, further comprising:
a cover formed by a front cover and a rear cover;
a panel supporting frame disposed inside the cover, so that the holder is accommodated between the rear cover and a rear surface of the panel supporting frame; and
a display interposed between the front cover and a front surface of the panel supporting frame.

* * * * *